United States Patent
Wang

(10) Patent No.: US 8,534,854 B2
(45) Date of Patent: Sep. 17, 2013

(54) KEY AND PORTABLE ELECTRONIC DEVICE USING THE SAME AND MANUFACTURING METHOD THEREOF

(75) Inventor: Kuo-Juei Wang, Taipei (TW)

(73) Assignee: Inventec Corporation (TW)

( * ) Notice: Subject to any disclaimer, the term of this patent is extended or adjusted under 35 U.S.C. 154(b) by 274 days.

(21) Appl. No.: 13/159,694

(22) Filed: Jun. 14, 2011

(65) Prior Publication Data

US 2012/0250327 A1 Oct. 4, 2012

(30) Foreign Application Priority Data

Mar. 31, 2011 (TW) .............................. 100111361 A

(51) Int. Cl.
*G01D 11/28* (2006.01)

(52) U.S. Cl.
USPC .................. 362/23.03; 362/23.04; 362/23.05; 362/23.07

(58) Field of Classification Search
USPC .......... 362/23.01, 23.03, 23.04, 23.05, 23.07, 362/551
See application file for complete search history.

(56) References Cited

U.S. PATENT DOCUMENTS

| | | | |
|---|---|---|---|
| 4,670,633 A * | 6/1987 | Kaiwa et al. .................. | 200/314 |
| 6,413,598 B1 * | 7/2002 | Motoki et al. ............... | 428/35.7 |
| 6,416,196 B1 * | 7/2002 | Lemarchand et al. .......... | 362/84 |
| 7,014,377 B2 * | 3/2006 | Yamauchi ..................... | 400/472 |
| 7,027,036 B2 * | 4/2006 | Yang ............................. | 345/170 |
| 7,650,056 B2 * | 1/2010 | Chen ............................. | 385/146 |
| 7,651,231 B2 * | 1/2010 | Chou et al. ...................... | 362/85 |

FOREIGN PATENT DOCUMENTS

| TW | 366463 | 8/1999 |
|---|---|---|
| TW | 201011799 | 3/2010 |
| TW | 201039365 | 11/2010 |

* cited by examiner

*Primary Examiner* — Evan Dzierzynski
(74) *Attorney, Agent, or Firm* — Lowe Hauptman & Ham, LLP

(57) ABSTRACT

A key, a portable electronic device using the same and a manufacturing method thereof are provided. The key includes a transmissible light member, a non-transmissible light member, a flexible light uniform member and a light source. The transmissible light member includes a body portion and a patterned portion protruded from the body portion. First and second recesses are formed at two opposite sides of the non-transmissible light member. The first recess connected to the second recess corresponds to the patterned portion, so that the patterned portion is embedded into the non-transmissible light member. The flexible light uniform member includes base and connecting portions. The connecting portion protruded from the base portion corresponds to the second recess, so that the connecting portion and the non-transmissible light member are combined. The light source is located in a third recess formed at the side of the base portion opposite to the connecting portion.

20 Claims, 8 Drawing Sheets

KEY AND PORTABLE ELECTRONIC DEVICE USING THE SAME AND MANUFACTURING METHOD THEREOF

This application claims the benefit of Taiwan application Serial No. 100111361, filed Mar. 31, 2011, the subject matter of which is incorporated herein by reference.

BACKGROUND OF THE INVENTION

1. Field of the Invention

The invention relates in general to a key, a portable electronic device using the same and a manufacturing method thereof, and more particularly to a light pervious key, a portable electronic device using the same and a manufacturing method thereof.

2. Description of the Related Art

As electronic apparatuses are now widely used in people's everyday life, input modules such as keys or touch panels have become communication mediums between the users and the electronic apparatuses. In general, for the user to be capable of identifying the position of the keys when the environmental illumination is inadequate, light emitting keys are already available in the market.

According to the design of the light emitting keys, a light shielding layer which shields the light is formed on a transparent structure by spraying or transferring the ink, so that the light generated by the light source can be emitted out via the position not disposed with the light shielding layer. In the example of the light shielding layer formed by way of spraying the ink, the ink is normally not uniformly sprayed on the transparent structure. In the example of the light shielding layer formed by way of transferring the ink, it could happen during the transferring process that the position is biased and the ink is not be uniformly distributed.

Regardless the light shielding layer is formed by way of spraying or transferring the ink, it is still very possible that the light generated by the light source may be emitted out via the light shielding layer, hence affecting the light shielding effect of the light shielding layer. Thus, how to provide a key with good light shielding effect and high yield rate has become an imminent task for the industries.

SUMMARY OF THE INVENTION

The invention is directed to a key, a portable electronic device using the same and a manufacturing method thereof. Through the cooperation of the transmissible light member, the non-transmissible light member and the flexible light uniform member, the light generated by the light source is emitted out via the transmissible light member only, hence avoiding the light shielding effect being deteriorated due to the poor disposition of the light shielding layer.

According to a first aspect of the present invention, a key including a transmissible light member, a non-transmissible light member, a flexible light uniform member and a light source is provided. The transmissible light member includes a body portion and a patterned portion. The patterned portion is protruded from the body portion. A first recess and a second recess are formed at two opposite sides of the non-transmissible light member. The first recess is connected to the second recess. The first recess corresponds to the patterned portion, so that the patterned portion is embedded into the non-transmissible light member. The flexible light uniform member includes a base portion and a connecting portion. The connecting portion is protruded from the base portion. The second recess corresponds to the connecting portion, so that the connecting portion and the non-transmissible light member are combined. A third recess is formed at the side of the base portion opposite to the connecting portion. The light source is located in the third recess.

According to a second aspect of the present invention, a portable electronic device including a casing, a substrate, a switch unit and a key is provided. The casing has an opening. The substrate is disposed in the casing. The switch unit is disposed on the substrate. The position of the switch unit corresponds to the position of the opening. The key is disposed on the substrate and covers the switch unit. The key includes a transmissible light member, a non-transmissible light member, a flexible light uniform member and a light source. The transmissible light member includes a body portion and a patterned portion. The patterned portion is protruded from the body portion. The transmissible light member is located in the opening. A first recess and a second recess are formed at two opposite sides of the non-transmissible light member. The first recess is connected to the second recess. The first recess corresponds to the patterned portion, so that the patterned portion is embedded into the non-transmissible light member. The flexible light uniform member includes a base portion and a connecting portion. The connecting portion is protruded from the base portion. The second recess corresponds to the connecting portion, so that the connecting portion and the non-transmissible light member are combined. A third recess is formed at the side of the base portion opposite to the connecting portion. The base portion is disposed on the substrate. The light source is disposed on the substrate and is located in the third recess.

According to a third aspect of the present invention, a manufacturing method of a key is provided. The manufacturing method includes the following steps: A transmissible light member and a non-transmissible light member are provided. The transmissible light member includes a body portion and a patterned portion. The patterned portion is protruded from the body portion. A first recess is formed at the non-transmissible light member. The first recess corresponds to the patterned portion, so that the patterned portion is embedded into the non-transmissible light member. A portion of the non-transmissible light member is removed from a side of the non-transmissible light member opposite to the first recess to form a second recess, so that the second recess is connected to the first recess. A connecting portion of a flexible light uniform member is embedded into the second recess. A third recess is formed at the flexible light uniform member. A light source is placed in the third recess.

The above and other aspects of the invention will become better understood with regard to the following detailed description of the non-limiting embodiment(s). The following description is made with reference to the accompanying drawings.

DETAILED DESCRIPTION OF THE INVENTION

Figure 1A:
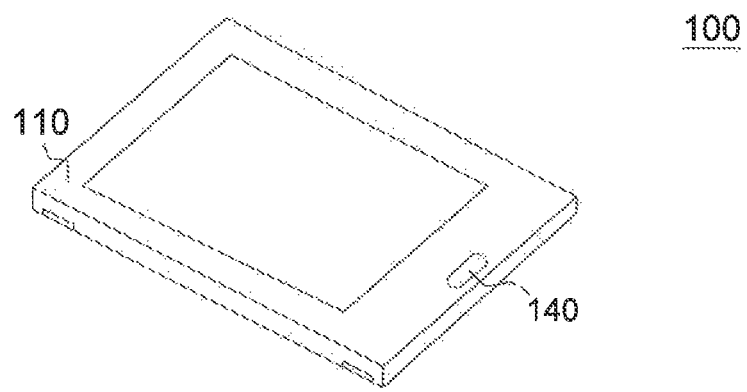
FIG. 1A shows an assembly diagram of a portable electronic device according to an embodiment of the invention.
Figure 1B:
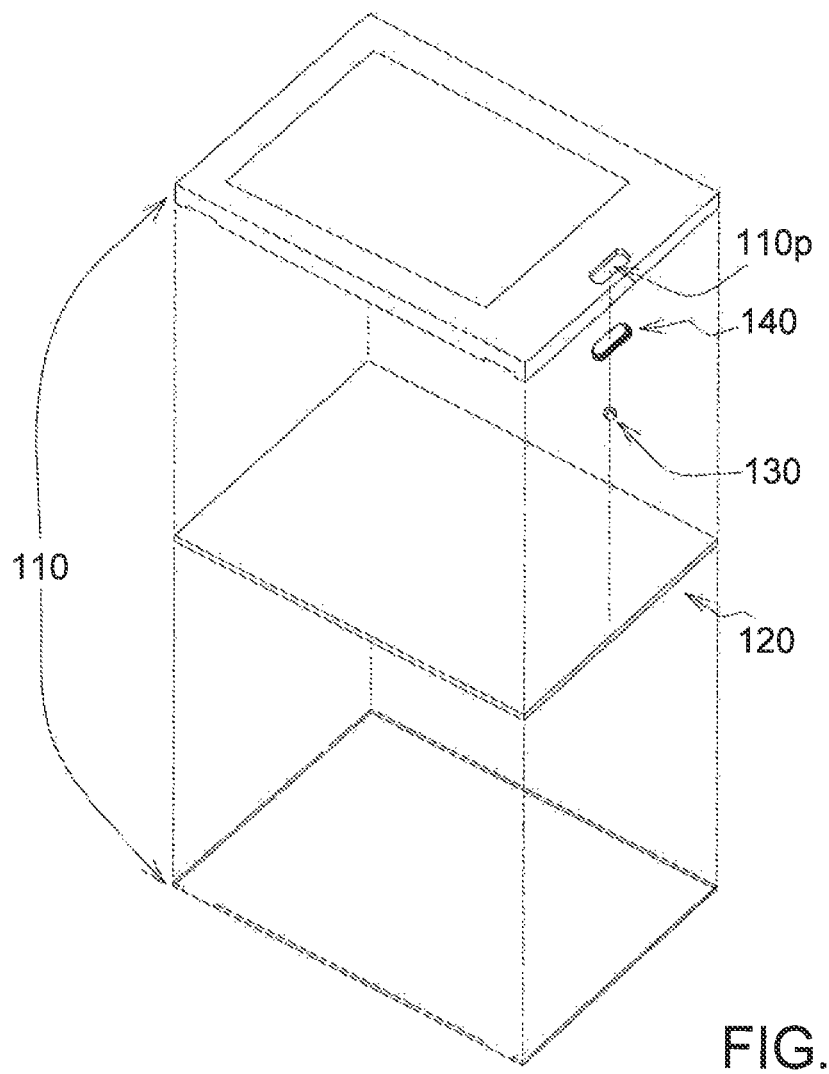
FIG. 1B shows an explosion diagram of the portable electronic device of FIG. 1A.

Referring to FIGS. 1A and 1B, an assembly diagram of a portable electronic device 100 according to an embodiment of the invention is shown in FIG. 1A, and an explosion diagram of the portable electronic device 100 of FIG. 1A is shown in FIG. 1B.

The portable electronic device 100 includes a casing 110, a substrate 120, a switch unit 130 and a key 140. The casing 110 has an opening 110p. The substrate 120 is disposed in the casing 110. The switch unit 130 is disposed on the substrate 120, and the position of the switch unit 130 corresponds to the position of the opening 110p. The key 140 is disposed on the substrate 120, and covers the switch unit 130.

Figure 2A:
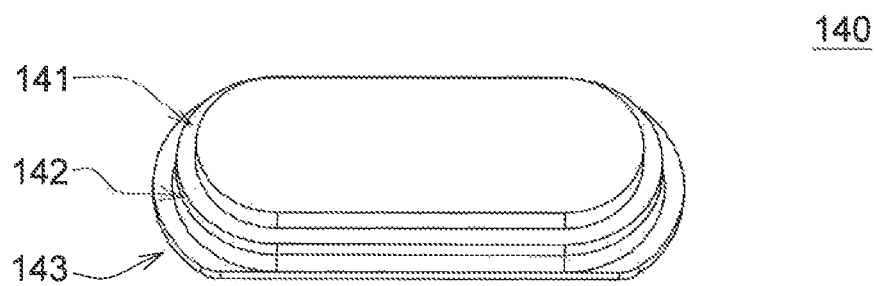
FIGS. 2A and 2B respectively are assembly diagrams of the key of FIG. 1 viewed from different view angles.
Figure 2B:
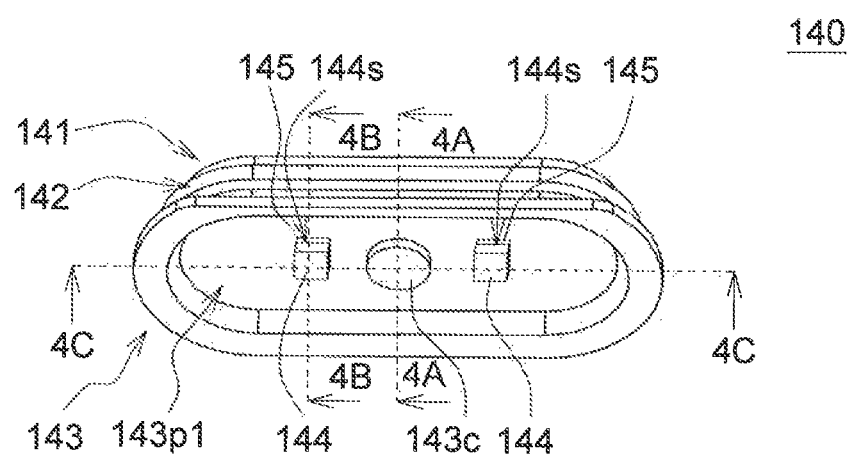
Figure 3A:
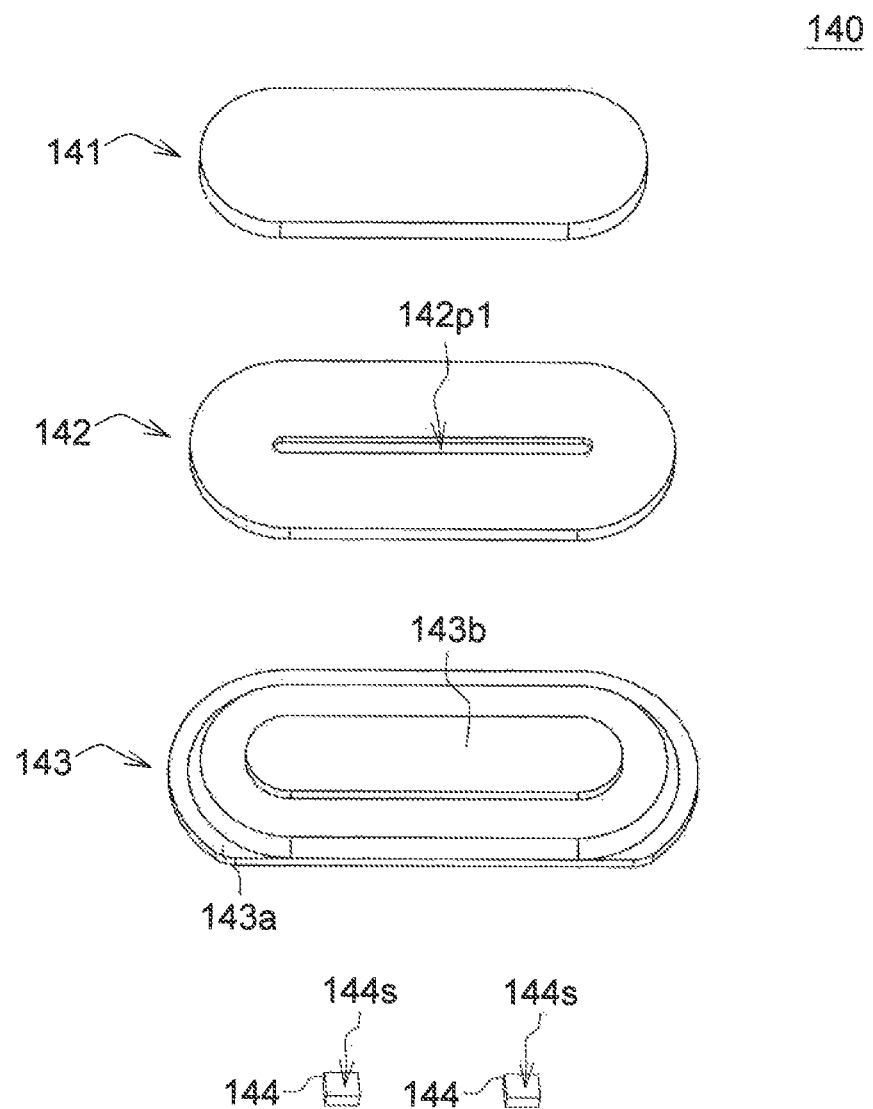
FIGS. 3A and 3B respectively are explosion diagrams of the key of FIGS. 2A and 2B.
Figure 3B:
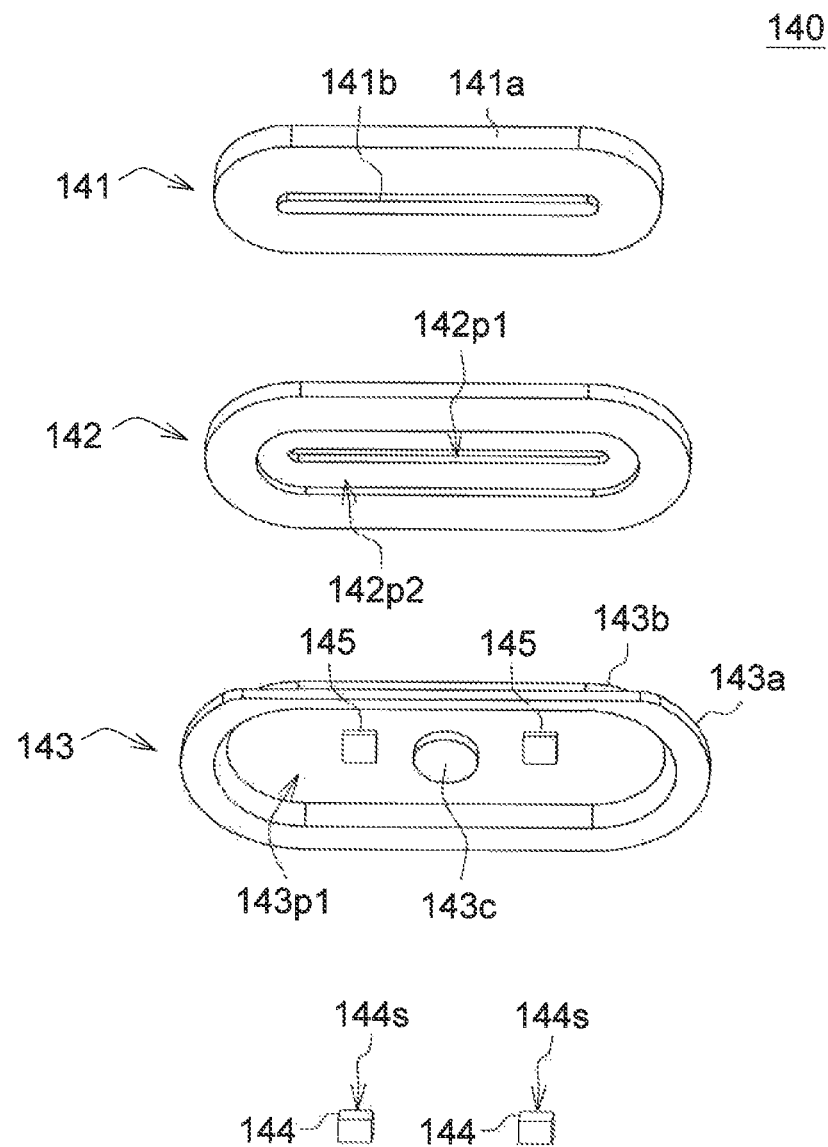
Figure 4A:
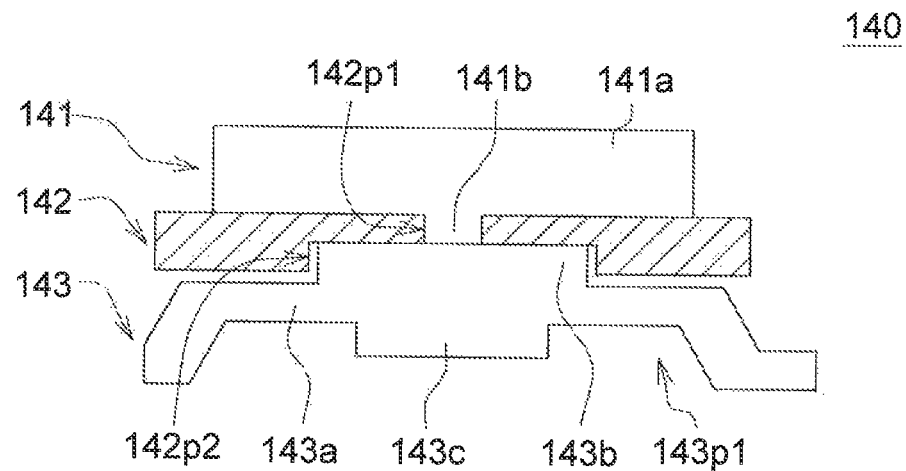
FIGS. 4A, 4B and 4C respectively are cross-sectional views of the key viewed along the cross-sectional lines 4A-4A, 4B-4B and 4C-4C of FIG. 2B.
Figure 4B:
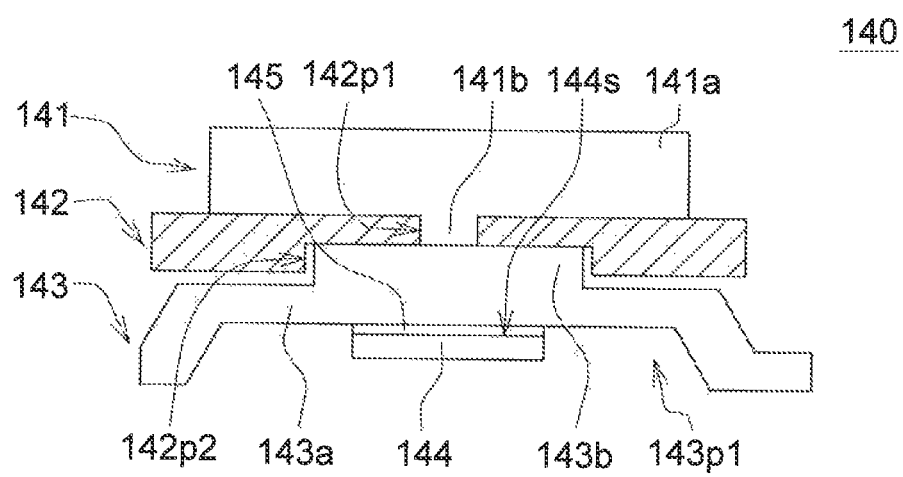
Figure 4C:
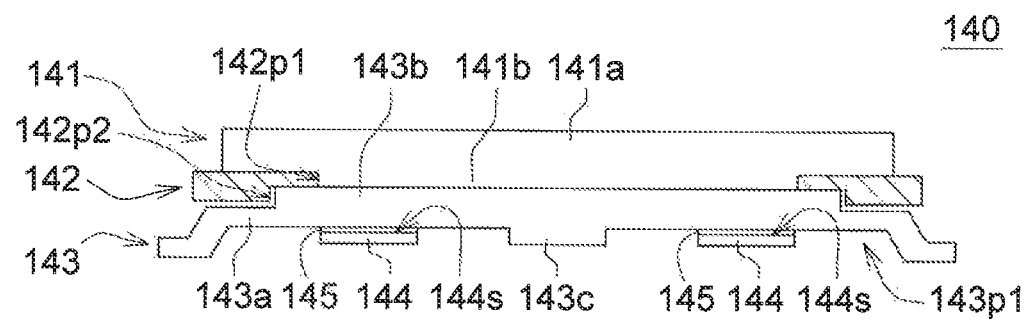

Referring to FIGS. 2A and 2B, FIGS. 3A and 3B, and FIGS. 4A, 4B and 4C, assembly diagrams of the key 140 of FIG. 1 viewed from different view angles are respectively shown in FIGS. 2A and 2B, explosion diagrams of the key 140 of FIGS. 2A and 2B are respectively shown in FIGS. 3A and 3B, and cross-sectional views of the key 140 viewed along the cross-sectional lines 4A-4A, 4B-4B and 4C-4C of FIG. 2B are respectively shown in FIGS. 4A, 4B and 4B.

The key 140 includes a transmissible light member 141, a non-transmissible light member 142, a flexible light uniform member 143 and a light source 144. The structures and dispositions of the aforementioned elements are disclosed below.

The transmissible light member 141 is disposed in the opening 110p and includes a body portion 141a and a patterned portion 141b. The patterned portion 141b is protruded from the body portion 141a.

A first recess 142p1 and a second recess 142p2 are formed at two opposite sides of the non-transmissible light member 142, and the first recess 142p1 is connected to the second recess 142p2. The first recess 142p1 corresponds to the patterned portion 141b, so that the patterned portion 141b is embedded into the non-transmissible light member 142.

The flexible light uniform member 143 includes a base portion 143a and a connecting portion 143b. The connecting portion 143b is protruded from the base portion 143a. The second recess 142p2 corresponds to the connecting portion 143b, so that the connecting portion 143b and the non-transmissible light member 142 are combined. The third recess 143p1 is formed at the side of the base portion 143a opposite to the connecting portion 143b. The base portion 143a is disposed on the substrate 120. The light source 144 is disposed on the substrate 120 and is located in the third recess 143p1.

In the present embodiment of the invention, the switch unit 130 can be realized by a metal dome or a switch. The flexible light uniform member 143 further includes a protruded portion 143c, which is protruded from the base portion 143a, and is located in the third recess 143p1. When the user presses the key 140, the protruded portion 143c moves towards the switch unit 130 and presses the switch unit 130, so that the switch unit 130 and circuits on the substrate 120 form a loop for transmitting the signals.

In addition, in the present embodiment of the invention, the patterned portion 141b of the transmissible light member 141 contacts the connecting portion 143b of the flexible light uniform member 143. The position of the light source 144 corresponds to the position of the patterned portion 141b of the transmissible light member 141, and a light outgoing surface 144s of the light source 144 faces the flexible light uniform member 143. The light source 144 is used for generating a light, and the light is radiated on the flexible light uniform member 143, so that the light is emitted out via the transmissible light member 141. Since the light is radiated on the flexible light uniform member 143 first, the light can thus be diffused and uniformed through the flexible light uniform member 143.

For enabling the light generated by the light source 144 to be emitted out more uniformly, the key 140 further includes a light uniform layer 145. The light uniform layer 145 is disposed between the light outgoing surface 144s of the light source 144 and the flexible light uniform member 143. Thus, the light can be uniformed through the light uniform layer 145 firstly and then is again uniformed through the flexible light uniform member 143 to avoid the light being centralized at the position of the light source 140.

Here, the transmissible light member 141 and the non-transmissible light member 142 can be formed by a double injection process, and the transmissible light member 141 and the non-transmissible light member 142 can be made by such as polycarbonate (PC) or polymethylmethacrylate (PMMA). The light uniform layer 145 can be realized by white ink.

The patterned portion 141b is bar-shaped as exemplified in the present embodiment of the invention. However anyone who is skilled in the technology of the invention will understand that the shape of the patterned portion 141b can also be a circle, a cross or other shapes according to the needs.

Figure 5:
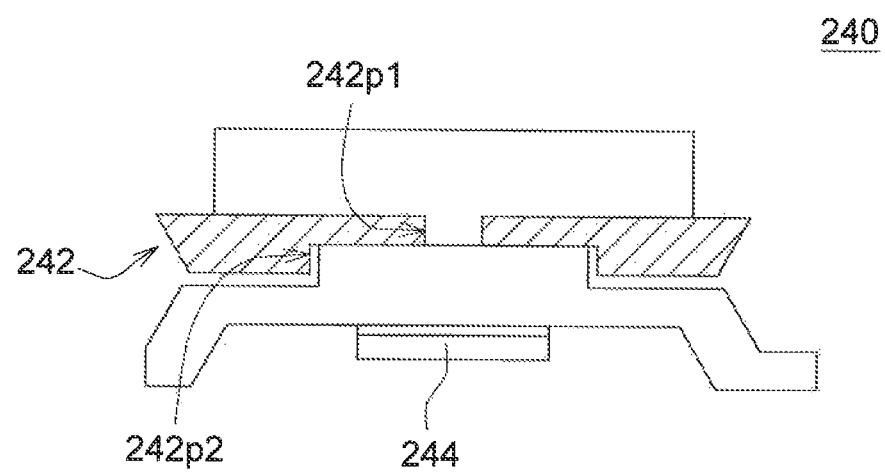
FIG. 5 shows a cross-sectional view of a key according to another embodiment of the invention.

Referring to FIG. 5, a cross-sectional view of a key 240 according to another embodiment of the invention is shown. In an embodiment, the peripheral of the non-transmissible light member 242 is gradually wider from a side formed with a second recess 242p2 towards a side formed with a first recess 242p1. That is, the peripheral of the non-transmissible light member 242 is gradually wider in a bottom-up way to avoid the light generated by a light source 244 being emitted out via unnecessary positions.

Referring to FIGS. 6A~6D, processes of a manufacturing method of the key 140 according to an embodiment of the invention are shown.

Figure 6A:
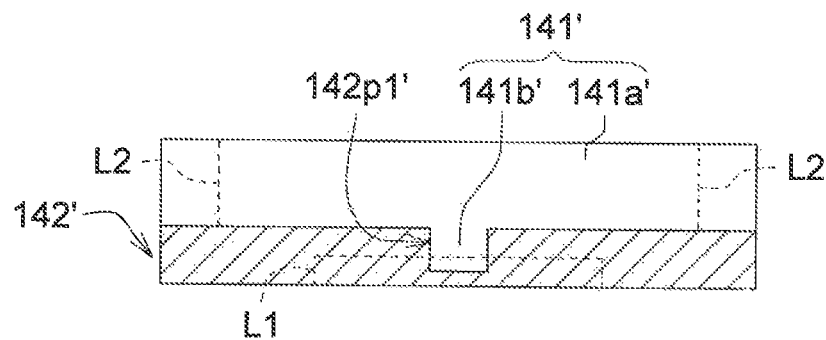
FIGS. 6A-6D show processes of a manufacturing method of the key according to an embodiment of the invention.

As indicated in FIG. 6A, a transmissible light member 141' and a non-transmissible light member 142' are provided. The transmissible light member 141' includes a body portion 141a' and a patterned portion 141b'. The patterned portion 141b' is protruded from the body portion 141a'. A first recess 142p1' is formed at the non-transmissible light member 142'. The first recess 142p1' corresponds to the patterned portion 141b', so that the patterned portion 141b' is embedded into the non-transmissible light member 142'. The transmissible light member 141' and the non-transmissible light member 142' provided here are formed by a double injection process, for example.

Figure 6B:
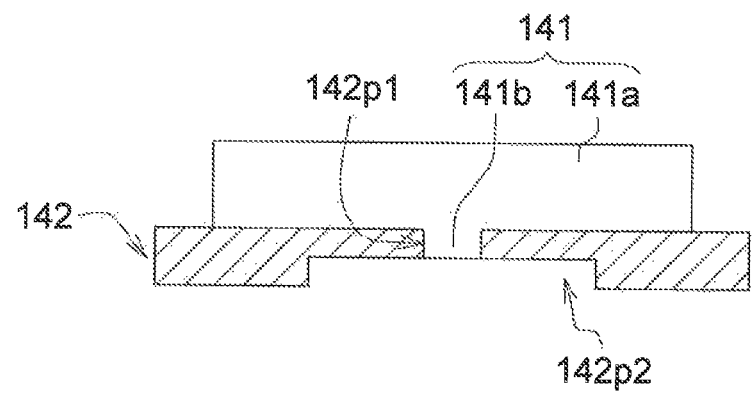

A portion of the non-transmissible light member 142' and a portion of the patterned portion 141b' are removed from a side of the non-transmissible light member 142' opposite to the first recess 142p1'. That is, a portion of the non-transmissible light member 142' and a portion of the patterned portion 141b' are removed along the dotted line L1 to form a second recess 142p2 (illustrated in FIG. 6B). In the present embodiment of the invention, the manufacturing method of the key 140 can further includes a step of removing the peripheral of the body portion 141a' of the transmissible light member 141', that is, a step of removing the body portion 141a' along the dotted line L2. As indicated in FIG. 6B, the remaining part of the body portion 141a' being the body portion 141a and the remaining part of the patterned portion 141b' being the patterned portion 141b together form the transmissible light member 141. Moreover, the remaining part of the non-transmissible light member 142' is the non-transmissible light member 142. In addition, the first recess 142p1' with a reduced depth is the first recess 142p1, and the second recess 142p2 is connected to the first recess 142p1. Here, the step of forming the second recess 142p2 and the step of removing the peripheral of the transmissible light member 141' can both be executed by the milling process.

Figure 6C:
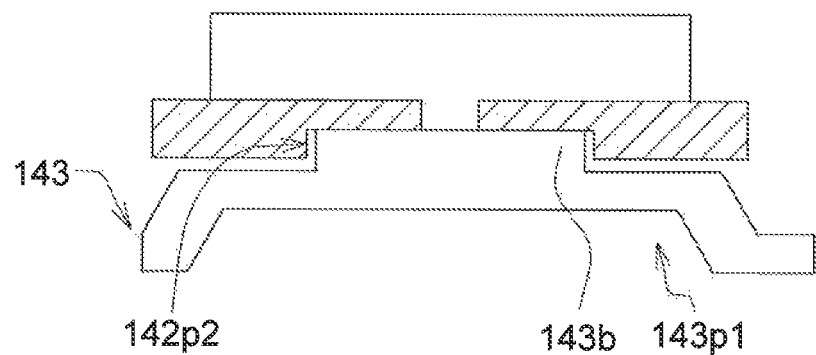

As indicated in FIG. 6C, the connecting portion 143b of the flexible light uniform member 143 is embedded into the second recess 142p2. The third recess 143p1 is formed at the flexible light uniform member 143.

Figure 6D:
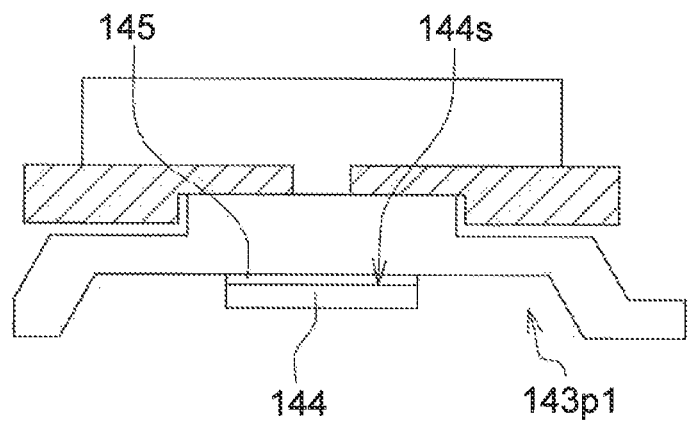

As indicated in FIG. 6D, the light source 144 is placed in the third recess 143p1. In addition, for enabling the light generated by the light source 144 to be more uniformly distributed and less centralized, the manufacturing method of the key 140 of the present embodiment of the invention can further include a step of forming the light uniform layer 145 between the light outgoing surface 144s of the light source 144 and the flexible light uniform member 143.

In the present embodiment of the invention, the second recess 142p2 is formed by way of removing the portion of the non-transmissible light member 142' and the portion of the patterned portion 141b'. In the case of removing only the portion of the non-transmissible light member 142' but not any part of the patterned portion 141b', there may be some residues of the non-transmissible light member 142' left on the patterned portion 141b'. Thus, the light generated by the light source 144 may be blocked by the residues of the non-transmissible light member 142' left on the patterned portion 141b', hence deteriorating the light utilization rate and luminance of the light source 144. To the contrary, in the present embodiment of the invention, the second recess 142p2 is formed by removing the portion of the non-transmissible light member 142' and the portion of the patterned portion 141b', hence avoiding the light utilization rate and luminance of the light source 144 being deteriorated due to the residues of the non-transmissible light member 142.'

According to the key, the portable electronic device using the same and the manufacturing method thereof disclosed in the above embodiments of the invention, the transmissible light member, the non-transmissible light member and the flexible light uniform member cooperate with one another. The flexible light uniform member makes the light generated by the light source more uniformed, and the non-transmissible light member, which shields the light, makes the light only emitted via the transmissible light member. Thus, the yield rate is increased, and the market competiveness is enhanced.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A key, comprising:
    a transmissible light member, comprising a body portion and a patterned portion, wherein the patterned portion is protruded from the body portion;
    a non-transmissible light member, wherein a first recess and a second recess are formed at two opposite sides of the non-transmissible light member, the first recess is connected to the second recess, and the first recess corresponds to the patterned portion, so that the patterned portion is embedded into the non-transmissible light member;
    a flexible light uniform member, comprising a base portion and a connecting portion, wherein the connecting portion is protruded from the base portion, the second recess corresponds to the connecting portion, so that the connecting portion and the non-transmissible light member are combined, and a third recess is formed at the side of the base portion opposite to the connecting portion; and
    a light source, located in the third recess.

2. The key according to claim 1, wherein the patterned portion of the transmissible light member contacts the connecting portion of the flexible light uniform member.

3. The key according to claim 1, wherein the flexible light uniform member further comprises a protruded portion protruded from the base portion and located in the third recess.

4. The key according to claim 1, wherein the peripheral of the non-transmissible light member is gradually wider from the side formed with the second recess towards the side formed with the first recess.

5. The key according to claim 1, wherein a light outgoing surface of the light source faces the flexible light uniform member, and the light source is used for generating a light radiated on the flexible light uniform member so as to emit out via the transmissible light member.

6. The key according to claim 5, wherein the position of the light source corresponds to the position of the patterned portion of the transmissible light member.

7. The key according to claim 6, further comprising a light uniform layer, wherein the light uniform layer is disposed between the light outgoing surface of the light source and the flexible light uniform member.

8. A portable electronic device, comprising:
    a casing having an opening;
    a substrate disposed in the casing;
    a switch unit disposed on the substrate, wherein the position of the switch unit corresponds to the position of the opening; and
    a key, wherein the key is disposed on the substrate and covers the switch unit, and the key comprises:
        a transmissible light member comprising a body portion and a patterned portion, wherein the patterned portion is protruded from the body portion, and the transmissible light member is located in the opening;
        a non-transmissible light member, wherein a first recess and a second recess are formed at two opposite sides of the non-transmissible light member, the first recess is connected to the second recess, and the first recess corresponds to the patterned portion, so that the patterned portion is embedded into the non-transmissible light member;
        a flexible light uniform member comprising a base portion and a connecting portion, wherein the connecting portion is protruded from the base portion, the second recess corresponds to the connecting portion, so that the connecting portion and the non-transmissible light member are combined, a third recess is formed at the side of the base portion opposite to the connecting portion, and the base portion is disposed on the substrate; and
        a light source disposed on the substrate and located in the third recess.

9. The portable electronic device according to claim 8, wherein the patterned portion of the transmissible light member contacts the connecting portion of the flexible light uniform member.

10. The portable electronic device according to claim 8, wherein the flexible light uniform member further comprises a protruded portion protruded from the base portion and located in the third recess, and when the flexible light uniform member is deformed, the protruded portion presses the switch unit.

11. The portable electronic device according to claim 8, wherein the peripheral of the non-transmissible light member is gradually wider from the side formed with the second recess towards the side of formed with the first recess.

12. The portable electronic device according to claim 8, wherein a light outgoing surface of the light source faces the flexible light uniform member, and the light source is used for generating a light radiated on the flexible light uniform member so as to emit out via the transmissible light member.

13. The portable electronic device according to claim 12, wherein the position of the light source corresponds to the position of the patterned portion of the transmissible light member.

14. The portable electronic device according to claim 13, wherein the key further comprises a light uniform layer disposed between the light outgoing surface of the light source and the flexible light uniform member.

15. A manufacturing method of a key, comprising:
   providing a transmissible light member and a non-transmissible light member, wherein the transmissible light member comprises a body portion and a patterned portion, the patterned portion is protruded from the body portion, a first recess is formed at the non-transmissible light member, and the first recess corresponds to the patterned portion, so that the patterned portion is embedded into the non-transmissible light member;
   removing a portion of the non-transmissible light member from a side of the non-transmissible light member opposite to the first recess to form a second recess, so that the second recess is connected to the first recess;
   embedding a connecting portion of a flexible light uniform member into the second recess, wherein a third recess is formed at the flexible light uniform member; and
   placing a light source in the third recess.

16. The manufacturing method of the key according to claim 15, wherein in the step of forming the second recess, a portion of the patterned portion is further removed.

17. The manufacturing method of the key according to claim 15, further comprising:
   removing the peripheral of the body portion of the transmissible light member.

18. The manufacturing method of the key according to claim 17, wherein the step of removing the peripheral of the body portion of the transmissible light member is executed by a milling process.

19. The manufacturing method of the key according to claim 15, further comprising:
   forming a light uniform layer between a light outgoing surface of the light source and the flexible light uniform member.

20. The manufacturing method of the key according to claim 15, wherein the step of forming the second recess is executed by a milling process.

* * * * *